United States Patent
Kaminski et al.

(10) Patent No.: US 6,291,976 B1
(45) Date of Patent: Sep. 18, 2001

(54) PHASE CONTROL FOR A COMPUTER SYSTEM MULTI-PHASE POWER SUPPLY

(75) Inventors: George A. Kaminski, Houston; William M. Fulghum, San Angelo, both of TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/580,159

(22) Filed: May 30, 2000

(51) Int. Cl.[7] .................................. G05F 1/44; G06F 1/26
(52) U.S. Cl. ........................... 323/283; 323/267; 713/300
(58) Field of Search ........................... 323/282, 283, 323/284, 285, 267; 363/148, 149, 86; 307/31; 713/300, 501

(56) References Cited

U.S. PATENT DOCUMENTS 5,581,274 * 12/1996 Tagawa .................................. 345/104
6,052,790 * 4/2000 Brown .............................. 323/267 X

* cited by examiner

Primary Examiner—Jessica Han
(74) Attorney, Agent, or Firm—Conley, Rose & Tayon, P.C.; Michael F. Heim; Mark E. Scott (57) ABSTRACT

A structure and related method for generating phase enable signals for a multi-phase switching power supply with the characteristic that each signal has the same frequency, but each differs in phase relationship. The structure includes a clock circuit coupled to a shift register and clocking the shift register. The shift register has one of its outputs coupled to its shift input signal line. Clocking of the shift register with the clock circuit produces a series of phase enable signals, at the shift register's shift output signal lines, to be coupled to switching phases of a multi-phase switching power supply. The circuit easily adapts to varying number of phases of the multi-phase switching power supply by changing which of the several shift output signals couples back to the shift input signal.

16 Claims, 5 Drawing Sheets

PHASE CONTROL FOR A COMPUTER SYSTEM MULTI-PHASE POWER SUPPLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to power supplies for computer systems. More specifically, the invention relates to switching power supplies for computer systems. More specifically still, the present invention relates to generating phase control signals for switching power supplies having multiple phases.

2. Background of the Invention

As computer system technology advances, specifically as manufacturing techniques related to microprocessors or central processing units (CPUs) advances, more and more transistors and related functionality are placed on a single die of a CPU. As more transistors are placed closer together on semiconductor substrates, less insulation material (in the form of oxide layers) exists between each transistor. Accordingly, CPU operating voltages are lowered to protect against electrical breakdown between transistors. However, adding transistors to a CPU increases the amount of electrical current the CPU requires. Thus, while the operating voltage for CPUs is generally dropping as technology advances, required operating currents are steadily rising. For example, Intel Corporation's most recent processor named the Pentium® 4 may have operating voltages in the range of 0.9–1.7 volts. Operating voltage for a particular processor, even in the same series, may differ depending on the characteristics of the particular CPU. While Intel's Pentium® 4 processor has a low voltage requirement, the processor may require as many as 50–60 Amps of current at peak loads. Compared to Intel's Pentium® II processor, which required only 20 Amps or less, this new processor as much as triples the amperage demand. Every computer system has a power supply that converts the 120 Volt alternating current (AC) found in a standard wall receptacle to suitable direct current (DC) voltages. This conversion from AC to DC is typically done by a switching power supply. A switching power supply supplying power to the Pentium® 4 processor should be capable of supplying current swings having transient response in the range of 100 Amps per micro-second. Prior CPU's may have required as little as 50 amps per micro-second transient response. Thus, there are increasing demands on the capabilities of switching power supplies with each advance in CPU technology. Other microprocessors may have similar power requirements, for example an AMD Athlon®.

Figure 1:
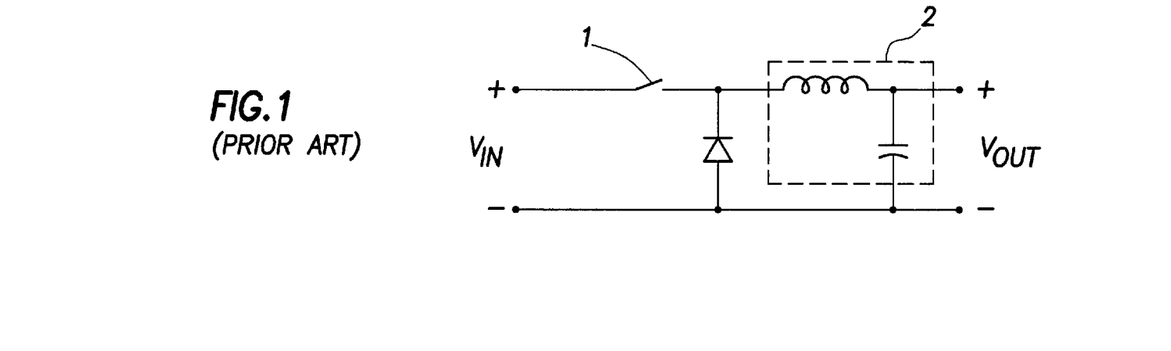
FIG. 1 shows a prior art structure of a buck-type switching power supply phase.

FIG. 1 shows an exemplary partial electrical schematic of a single phase blick-type switching power supply. The circuit shown in FIG. 1 is said to have only a single phase because it has only one switch and inductor combination. If there were several of these switch and inductor combinations present, the power supply would be considered a multi-phase switching power supply. Buck-type switching power supplies are designed to provide lower direct current (DC) voltages than applied at their inputs while supplying the current demand of a load (e.g., CPU). Power supplies provide reduced DC voltages by "chopping" the supply voltage (i.e. turning on and off at a particular frequency )via switch 1 and then averaging, by means of an inductor/capacitor circuit 2, the chopped voltage to produce DC voltage at the desired level.

In the early days of microprocessor technology, a computer system switching power supply may have had only a single phase, as explained above, inasmuch as the processor voltage and amperage requirements were such that a single phase switching power supply was capable of producing the desired voltage with the desired current. While a single phase switching power supply may be capable of meeting average voltage and current requirements, a single phase alone may not be capable of meeting higher transient requirements of modern CPUs. Another consideration in switching power supply design, especially as related to power supplies mounted on a motherboard, is the amount of space required to implement such a supply. If a single switching phase is used, the inductor and capacitor in the averaging portion of the circuit may need to be excessively large occupying too much space on the motherboard.

Increasing the number of phases in a switching power supply permits the capacitor and inductor in each phase to be smaller, as is well understood in the art. Thus, in response to demands such as these, manufacturers generally have increased the number of phases in switching power supplies to meet increasing amperage requirements, space limitations and transient response requirements. However, there are various problems associated with having multiple phases in a switching power supply including how to generate phase control signals as the number of phases increases.

BRIEF SUMMARY OF THE INVENTION

The problems noted above are solved in large part by a method and apparatus for generating phase enable signals to be coupled to switches of the various phases of a switching power supply. The phase enable signals are created by generating a master clock signal having a frequency substantially equal to the number of phases multiplied by the switching frequency of each phase. This master clock signal couples to a shift register clock input signal. One of the shift output signals of the shift register, a feedback signal, is coupled to the shift input of the shift register by way of an inverting buffer. By clocking the shift register at the frequency of the master clock, and thereby shifting in the inverted representation of one of the shift Output signals, a series of phase enable signals are generated with each having the same frequency, yet shifted in phase. The master clock generation in combination with the shift register is easily adapted to accommodate switching power supplies having a various number of switching phases.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be intepreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The terms "switch enable signals" and "phase enable signals", while sounding similar, are meant to convey distinct ideas. The term "switch enable signal" is meant to be that signal applied to the switch of a phase of a switching power supply where the duty cycle of the switch enable signal is directly the duty of the cycle applied to the switch. By contrast, the term "phase enable signal" is indeed a time varying signal, however, the term is meant to convey only that a particular phase is allowed to conduct. The duty cycle of a phase enable signal does not act to control the duty cycle of a signal applied to a switch of a switching power supply except to the extent the phase enable signal may place an upper limit.

DETAILED DESCRIPTION OF THE PREFERRED EMBODIMENTS

The ability to meet more stringent current transient requirements is typically addressed by power supply designers by increasing the number of phases of the switching power supply. However, each phase of the switching power supply must become operational at the proper time. The preferred embodiment of this invention is a mechanism for generating phase enable signals such that each phase of the multi-phase switching power supply may become active at the proper time.

Figure 2:
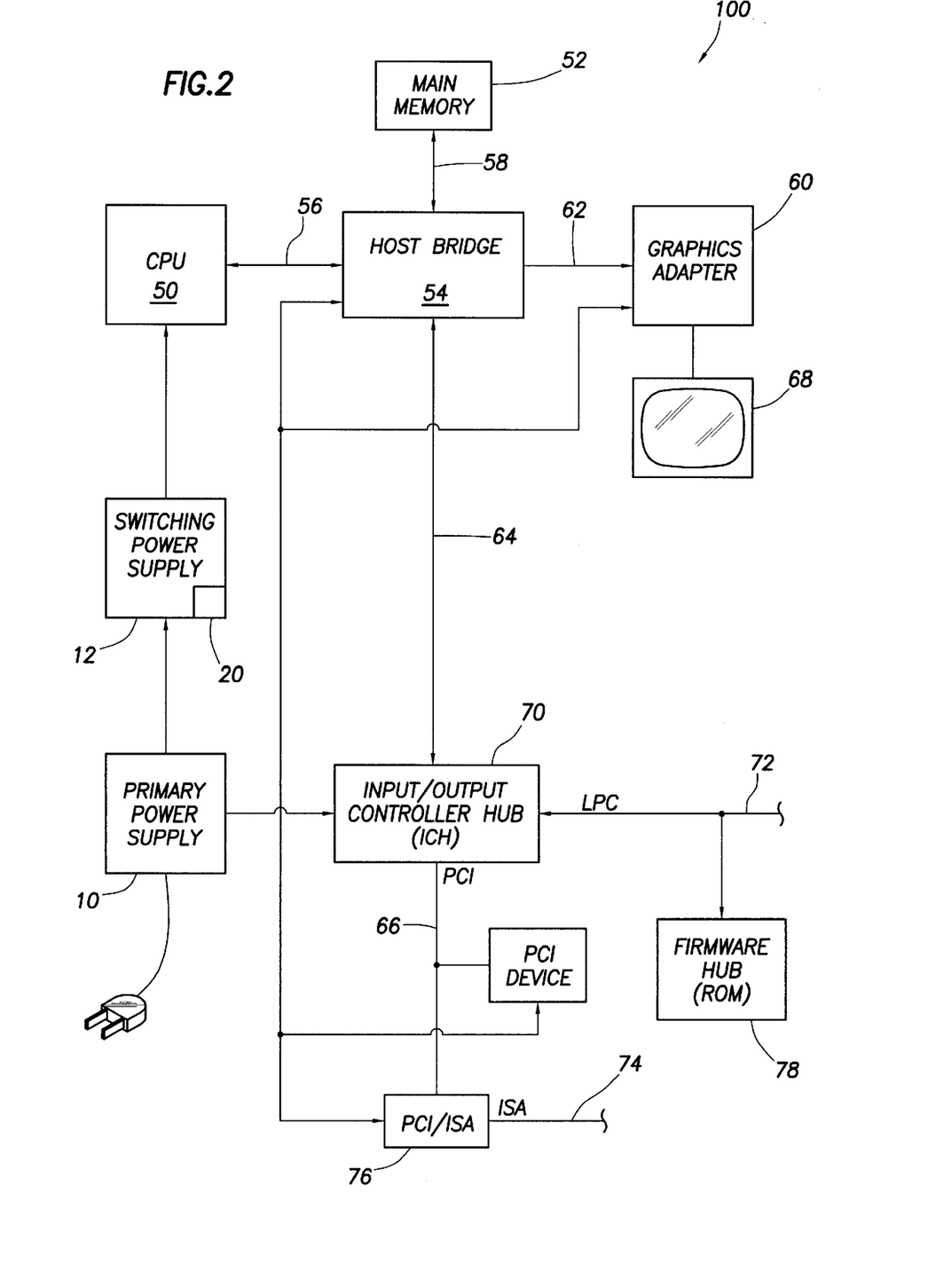
FIG. 2 is a block diagram of a computer system of the preferred embodiment.

With respect to a computer system, and as exemplified in FIG. 2, the preferred arrangement for providing current and voltage to a central processing unit (CPU) involves two power supplies. The first, or primary power supply 10, transforms and/or rectifies as necessary the 120 volt alternating current (AC) available at a standard wall socket. This primary power supply 10 creates a plurality of voltages for use by various system components. However, this primary power supply 10, which preferably is an individual power supply mounted within the computer system chassis but not on the motherboard itself, is typically not capable of supplying voltages and currents necessary for the latest generation of central processing units. The problem of providing the correct voltages and currents to the CPU preferably is addressed by having a switching power supply 12 which converts the DC voltages supplied by the primary power supply 10 to voltages and currents, with applicable transient response, to be applied to the CPU. It is noted that the primary power supply 10 itself may be a switching power supply.

For a multi-phase buck-type switching power supply, the duty cycle of the signal applied to the switches of the power supply will be the same for each switching phase so that the overall output voltage of the switching power supply remains at its desired level. It is desirable that while each of the switching phases have the same switching frequency, each switching phase should operate in a different phase relationship to all the other phases. For example, if a switching power supply has two phases, the conduction signal for each phase should have the same frequency, but they should differ in phase relationship by 180 degrees. Likewise, if a switching power supply has three phases, the conduction signal for each phase should have the same frequency but vary in phase relationship by 120 degrees.

Figure 4:
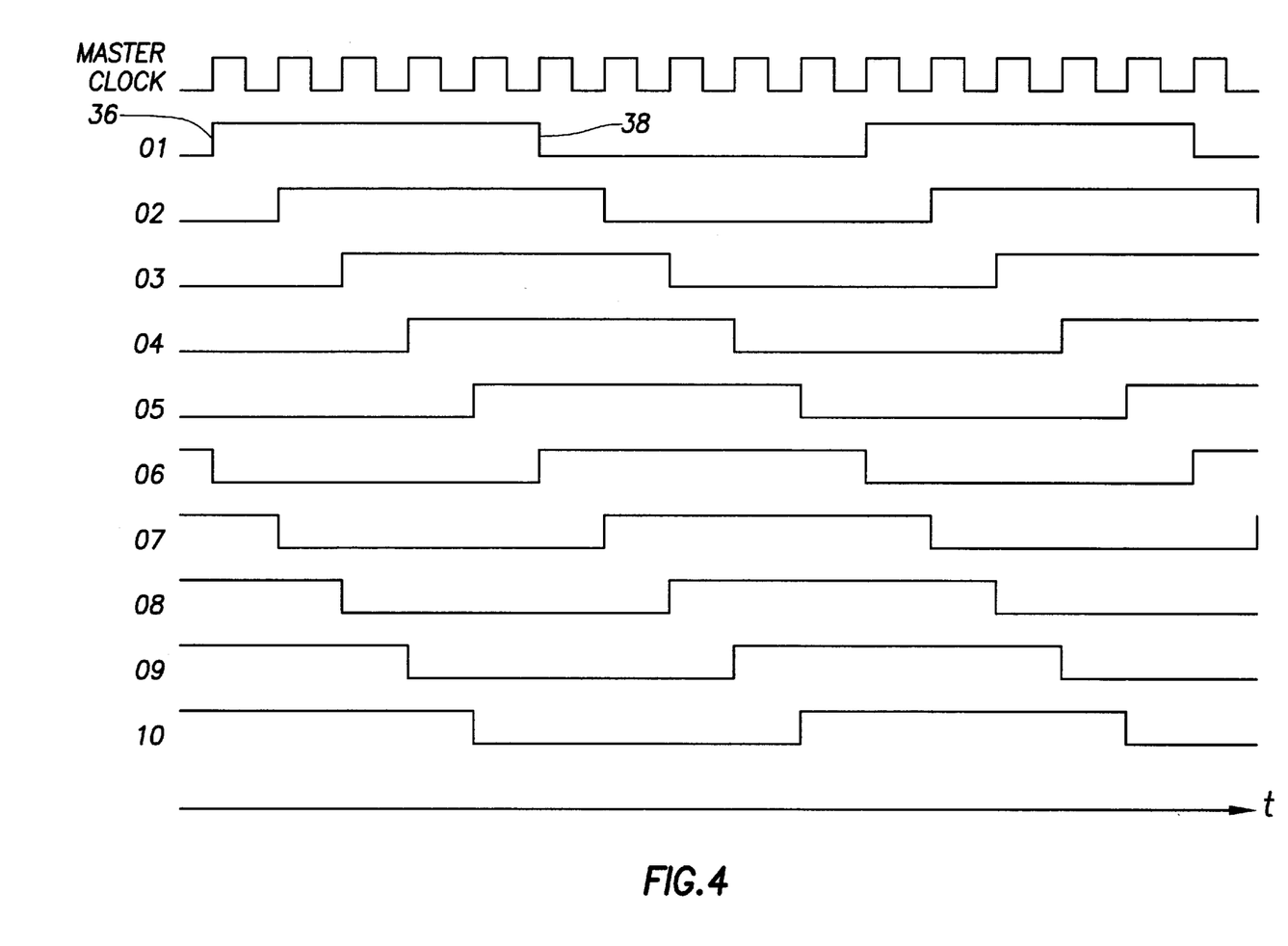
FIG. 4 shows a timing diagram of phase enable signals for a ten phase switching power supply.

As shown in FIG. 2, the switching power supply 12 has a phase enable generation circuit 20. Phase enable generation circuit 20 generates a series of phase enable signals. Each of these phase enable signals has the same frequency, yet each differs in phase relationship. FIG. 4 shows an exemplary timing diagram for phase enable generation circuit 20 generating ten phases of phase enable signals. It can be clearly seen in FIG. 4 that each of the phase enable signals, labeled phase one through phase ten ($\Phi 1 \ldots \Phi 10$), have the same frequency of operation. It is also noted that each of these signals differs in phase relationship. The degree of difference in phase relationship is based on the number of phases. Generating ten phases of phase enable signals preferably requires shifting each of these signals in phase by 36 degrees. As a second example, if eight phases of switch enable signals are required for a particular switching power supply, the phase difference between each of the phase enable signals would be 45 degrees. Thus, the phase difference required between each phase enable signal in a particular system can generally be expressed by the following equation:

$$\text{Phase\_Delta} = 360 \div \Phi \quad (1)$$

where $\Phi$ is the number of phases in the switching power supply.

Figure 3:
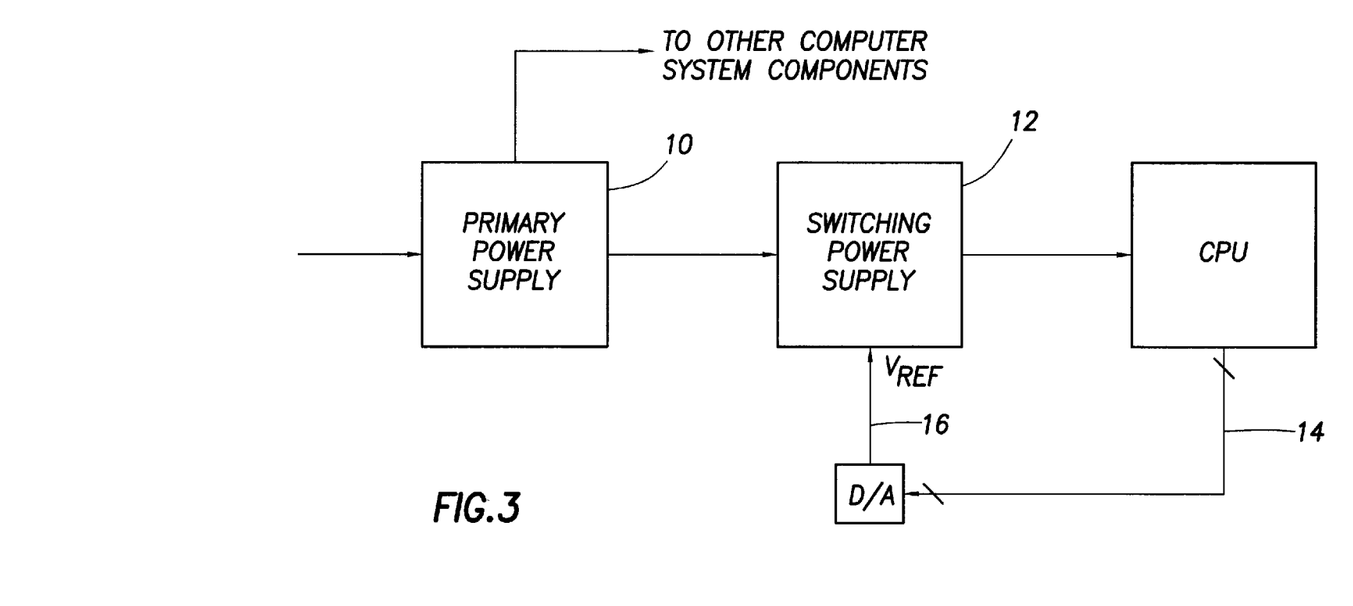
FIG. 3 is a block diagram showing coupling among computer system power supplies and the computer system's CPU.

Each CPU from a family of microprocessors may require a different voltage in a range of voltages. For example, processors in Intel's Pentium® 4 family may require an operating voltage from 0.9 volts to 1.7 volts. This required voltage may change for two processors having otherwise exactly the same characteristics. Since each CPU may have a different operating voltage, each CPU likewise has the capability of informing its host motherboard of its required operational voltage. This notification preferably is done by means of 5 digital signal pins that, based on their asserted or non-asserted state, indicate the required operational voltage. As shown in FIG. 3, these digital signal pins 14 are preferably coupled to a digital to analog (D-A) converter which converts the digital representation to an analog voltage. This analog voltage becomes a reference signal 16 indicating, either directly or by multiplication of a scale factor, the correct operational voltage of the CPU. The switching power supply 12 preferably uses this reference signal 16 to set its duty cycle to control its output voltage such that the output voltage signal 18 substantially matches the voltage of the reference signal 16.

Figure 5:
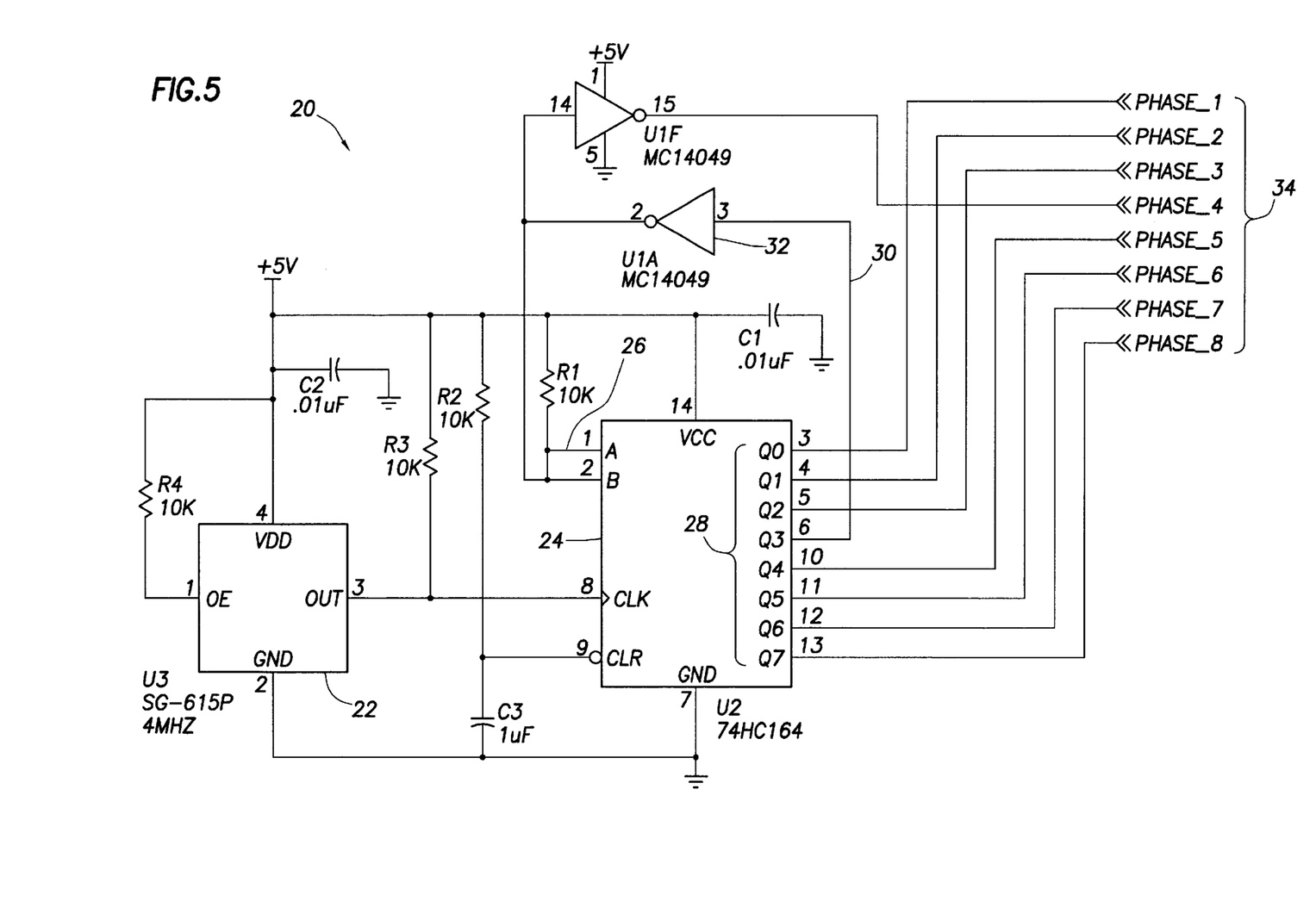
FIG. 5 shows the preferred structure for generation of the phase enable signals for an eight phase switching power supply.

While there may be many possible structures which may generate the various but related phase enable signals exemplified in FIG. 4, FIG. 5 shows the preferred structure which generates eight phases. FIG. 5 shows a master clock 22 which is preferably a crystal oscillator having an operable oscillation frequency as defined by the following equation:

$$\text{Master\_Clock\_Frequency} = \text{Phase\_Switching\_Frequency} \times \Phi \quad (2)$$

where Φ is the number of phases in the switching power supply and the Phase_Switching_Frequency is the frequency at which each phase of the switching power supply is turned on and off. Thus, in the preferred embodiment having eight phases with each phase having, a switching frequency of 500 kHz, the master clock 22 has an operable frequency of 4 MHz. While master clock 22 is preferably a crystal oscillator, as the frequencies of operation drop, it may be possible to use other types of circuits to generate the signals, including 555 timers.

The master clock preferably couples to an eight bit shift register 24. A shift register is characteristically known for shifting in, at a shift input signal 26, various asserted or non-asserted states. These signals transition respectively through shift output signals 28. In FIG. 5 the shift output signals 28 are labeled Q0 through Q7. Signals shifted in through on the shift input signal 26 transition with each clock cycle from QO to Q7 respectively. Thus, the master clock controls how fast values on the shift input signal 26 clock through the shift output signals 28.

One of the shift output signals 28 feeds back to the shift input signal 26, thus becoming a feedback signal 30. Which of the plurality of signals feeds back depends on the number of phase enable signals needed for a particular system. For proper operation of the phase enable generation circuit 20, the selected shift output signals must be modified by a logical NOT before being applied to the shift input signal 26. This is preferably accomplished by use of an inverting buffer 32. One of ordinary skill in the art is well aware of how to perform a NOT operation and may do so with various structures, all of which are within the contemplation of this invention.

Figure 6:
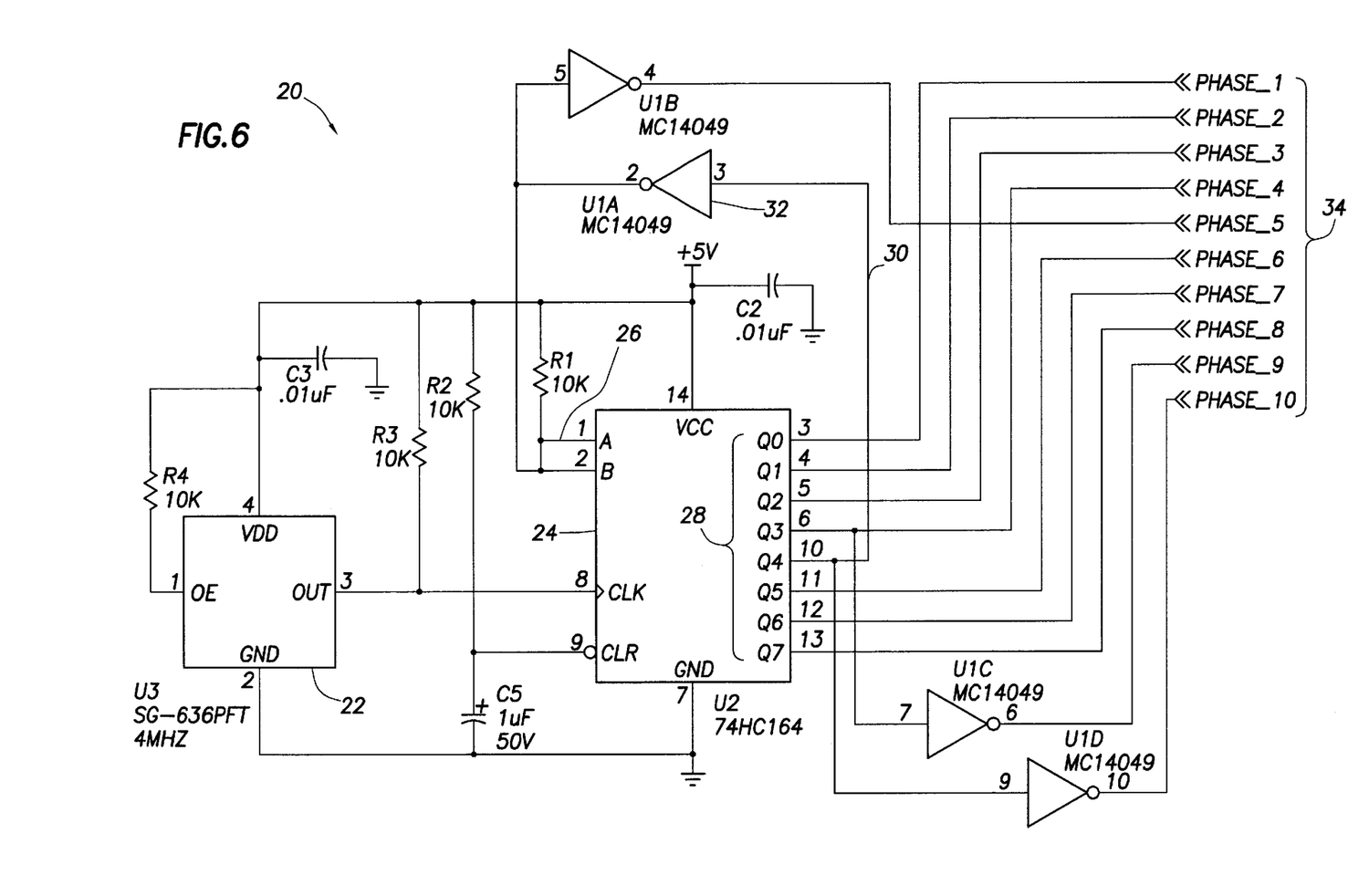
FIG. 6 shows an exemplary structure for generation of phase enable signals for a ten phase switching power supply.

Selecting which shift output signal should become the feedback signal 30 is based on the number of phases required for the particular switching power supply. FIG. 5 exemplifies generating eight phase enable signals 34 preferably for use with a switching power supply having eight phases. However, if the goal of the switch enable circuit 20 is to generate ten phases having the same frequency yet varying in phase relationship by 36 degrees, Q4 becomes the feedback signal coupled to the inverting buffer 32 as shown in FIG. 6. Thus, the stricture as exemplified in FIGS. 5 and 6 is a circuit that may be easily modified to generate an even plurality of phase enable signals 34 for switching power supplies having different numbers of phases.

The timing diagram shown in FIG. 4 also exemplifies the master clock signal. As discussed above, as the phase enable generation circuit 20 is adapted for switching power supplies having varying numbers of phases, the frequency of the signal generated by the master clock 22 may change. FIG. 4 exemplifies a master clock whose frequency is ten times that of the switching frequency of any one of the phase signals. That is, the frequency of the master clock 22 in FIG. 4 is the switching frequency of 400 kHz multiplied by ten, the number of phases. If the switch enable generation circuit 20 shown in FIG. 6 is modified to provide a different even number of switch enable signals 34, yet having the same switching frequency, not only must the feedback signal 30 change, but also the frequency of the master clock 22 must change to fit or match Equation 1.

It must be understood however that the phase enable signals 34 as generated by the phase enable generation circuit 20, and exemplified for ten phases in FIG. 4, each have a duty cycle of 50%. However, this is not to be confused with the duty cycle of the switch or conduction signals applied to each conductive switch of the switching power supply. The phase enable signals 34 merely allow the switches of each phase to operate, to the extent they need to. Thus, while phase one, for instance, may conduct for the amount of time between its rising edge 36 and falling edge 38, the actual conduction time of the switch of the first phase may be, and preferably is, significantly shorter than this time. The duty cycle of the phase enable signals may be greater or less than the exemplary 50% shown so long as this duty cycle does not become so short as to diminish each conduction phase's ability to supply power.

FIG. 2 shows the preferred embodiment computer system 100 implementing the improvements disclosed herein. Shown is FIG. 4 is a CPU 50 coupled to a main memory 52 and various other peripheral computer system components through an integrated host bridge 54. The CPU 50 preferably couples to the host bridge 54 via a host bus 56, or the host bridge logic 54 may be integrated into the CPU 50. The CPU 50 may comprise, for example, a Pentium®4 microprocessor. It should be understood, however, that the computer system 100 could include many other alternative microprocessors. Thus, the computer system may implement other bus configurations or bus bridges in addition to, or in place of, those shown in FIG. 4.

Main memory 52 preferably couples to the host bridge 54 through a memory bus 58. The host bridge 54 preferably includes a memory control unit (not shown) that controls transactions to the main memory 52 by asserting the necessary control signals during memory accesses. The main memory 52 functions as the working memory for the CPU 56 and generally includes a conventional memory device or array of memory devices in which programs, instructions and data are stored. The main memory 52 may comprise any suitable type of memory such as dynamic random access memory (DRAM) or any of the various types of DRAM devices such as synchronous DRAM (SDRAM), extended data output DRAM (EDO DRAM), or RAMBUS™ (RDRAM). The computer system 100 also preferably includes a graphics controller or video driver card 60 that couples to the host bridge 54 via an advanced graphics port (AGP host) bus 62. Alternatively, the video driver card 60 may couple to the primary expansion bus 64 or one of the secondary expansion buses, for example, the PCI bus 66. Graphics controller 60 further couples to a display device 68 which may comprise any suitable electronic display device upon which any image or text can be represented.

The computer system 100 preferably includes an input/output controller hub (ICH) 70. The ICH 70 acts as a bridge logic device bridging the primary expansion bus 64 to various secondary buses including a low pin count (LPC bus) 72 and a peripheral components interconnect bus 66. Although the ICH is shown only to support the LPC bus 72 and the PCI bus 66, various other secondary buses may be supported.

In the preferred embodiment shown in FIG. 2, the primary expansion bus 64 comprises a hub-link bus. Hub-link is a proprietary bus of the Intel™ Corporation. However, computer system 100 is not limited to any particular type of primary expansion bus, and thus, various buses may be used. Industries standard architecture (ISA) bus 74 is shown in the preferred embodiment coupled to the ICH 70 by way of a PCI to ISA bridge device 76

Also shown in FIG. 2 is a firmware hub 78. The firm-ware hub 78 couples to the ICH 70 by way of the LPC bus 72. The firmware hub 78 preferably comprises read only memory (ROM) which contains software programs executed by the CPU 50. The software programs preferably include both instructions executed during power on self tests (POST) procedures and basic input/output systems (BIOS) commands. These software programs perform various functions including verifying proper operation of various computer system components before control of the system is turned over to the operating system.

The combination of the primary power supply 10 and switching power supply 12 provide the required voltages and current for the CPU 50 of the computer system 100. Switching power supply 12 preferably comprises a switch enable generation circuit 20 adapted to generate the necessary switch enable signals 34 for the various phases of the switching power supply 12.

The above discussion is meant to be illustrative of the principles and various embodiments of the present invention. Numerous variations and modifications will become apparent to those skilled in the art once the above disclosure is fully appreciated. For example, although the preferred embodiment is disclosed as having two distinct power supplies, one mounted on the motherboard and another mounted in a separate location, it may be possible that the functionality described with reference to the two distinct power supplies could be housed in a single location off the motherboard. Further, the embodiments disclosed could be integrated into a single IC package, or could be implemented in discrete components, and each is within the contemplation of the invention. It is intended that the following claims be interpreted to embrace all such variations and modifications.

What is claimed is:

1. A method of generating phase enable signals for switches of a switching power supply, said switching power supply having a plurality of phases, the method comprising:
   generating a master clock signal having a frequency substantially equal to the number of phases in the switching power supply multiplied by a switching frequency of said phases of said switching power supply;
   applying the master clock signal to a clock input signal of a shift register having a plurality of shift output signals;
   coupling an inverted representation of one of said shift output signals to an input signal of the shift register;
   clocking the shift register with said master clock signal; and thereby
   creating a plurality of phase enable signals to be coupled one each to each phase of the switching power supply, each phase enable signal having the same frequency but varying in phase relationship.

2. The method as defined in claim 1 wherein said generating the master clock signal further comprises generating the master clock by means of a crystal oscillator.

3. The method as defined in claim 1 wherein coupling an inveiled representation of the shift output signal further comprises:
   coupling the selected output signal of the shift register to an inverting buffer; and
   coupling an output signal of the inverting buffer to the shift input signal of the shift register.

4. An apparatus for generating phase enable signals for a switching power supply having a plurality of switch phases, comprising:
   a master clock circuit adapted to generate a master clock signal;
   a shift register coupled to the master clock signal, and wherein said shift register having a shift input signal and a plurality of shift output signals;
   a feedback signal, being one of said shift output signals, said feedback signal coupled to said shift input signal of said shift register; and
   wherein said master clock signal clocks the shift register, and wherein said shift register creates a plurality of phase enable signals at its plurality of shift output signals, with each phase enable signal having the same frequency, but differing in phase relationship.

5. The structure as defined in claim 4 wherein said master clock circuit further comprises a crystal oscillator adapted to generate said master clock signal.

6. The structure as defined in claim 4 wherein said shift register further comprises an eight bit shift register.

7. The structure as defined in claim 4 wherein said feedback signal further comprises:
   one of said shift output signals coupled to an input signal of an inverting buffer; and
   an output signal of the inverting buffer coupled to said shift input signal of the eight bit buffer.

8. A computer system comprising:
   a processor;
   a main memory;
   a graphics adapter coupled to the processor;
   a display device coupled to the graphics adapter;
   a primary power supply having a supply output signal;
   a switching power supply coupled to said primary power supply via said supply output signal, said switching power supply providing a power supply output signal, and having a plurality of switching phases; and
   wherein said switching power supply comprises a master clock circuit and a shift register adapted to generate a plurality of phase enable signals, with each phase enable signal having the same frequency, but differing in phase relationship.

9. A computer system comprising:
   a processor;
   a main memory;
   a graphics adapter coupled to the processor;
   a display device coupled to the graphics adapter;
   a primary power supply having a supply output signal;
   a switching power supply coupled to said primary power supply via said supply output signal, said switching power supply providing a power supply output signal, and having a plurality of switching phases;
   wherein said switching power supply comprises a master clock circuit and a shift register adapted to generate a plurality of phase enable signals, with each phase enable signal having the same frequency, but differing in phase relationship;
   said master clock circuit adapted to generate a master clock signal;
   said shift register coupled to the master clock signal, said shift register having a shift input signal and a plurality of shift output signals;
   feedback signal, being one of said shift output signals, said feedback signal coupled to said shift input signal of said shift output register; and
   wherein said master signal clocks the shift register, and wherein said shift register creates a plurality of phase enable signals at its plurality of shift output signals, with each phase enable signal having the same frequency, but differing in phase relationship.

10. The computer system as defined in claim 9 wherein said master clock circuit further comprises a crystal oscillator adapted to generate said master clock signal.

11. The computer system as defined in claim 9 wherein said shift register comprises an eight bit shift register.

12. The computer system as defined in claim 9 wherein said feedback signal further comprises:

one of said shift output signals coupled to an input signal of an inverting buffer; and an output signal of the inverting buffer coupled to said shift input signal of the eight bit buffer.

13. A power supply for a computer system comprising:

a plurality of switching phases;

a master clock circuit adapted to generate a master clock signal;

a shift register coupled to the master clock signal, and wherein said shift register having a shift input signal and a plurality of shift output signals;

a feedback signal, being one of said shift output signals, said feedback signal coupled to said shift input signal of said shift register;

wherein said master clock signal clocks the shift register, and wherein said shift register creates a plurality of phase enable signals at its plurality of shift output signals, with each phase enable signal having the same frequency, but differing in phase relationship; and said phase enable signals coupled one each to each of said plurality of switching phases.

14. The power supply as defined in claim 13 wherein said master clock circuit further comprises a crystal oscillator adapted to generate said master clock signal.

15. The power supply as defined in claim 13 wherein said shift register further comprises an eight bit shift register.

16. The power supply as defined in claim 13 where said feedback signal further comprises:

one of said shift output signals coupled to an input signal of an inverting buffer; and an output signal of the inverting buffer coupled to said shift input signal of the eight bit buffer.

\* \* \* \* \*